(12) United States Patent
Isaman

(10) Patent No.: US 7,779,236 B1
(45) Date of Patent: Aug. 17, 2010

(54) SYMBOLIC STORE-LOAD BYPASS

(75) Inventor: David L. Isaman, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/443,160

(22) Filed: Nov. 19, 1999

Related U.S. Application Data

(60) Provisional application No. 60/114,295, filed on Dec. 31, 1998.

(51) Int. Cl.
*G06F 9/40* (2006.01)
(52) U.S. Cl. ............. 712/216; 712/225; 712/219; 712/217; 712/215
(58) Field of Classification Search ............ 712/201, 712/213, 202, 203, 210, 7, 237, 141, 18, 712/230, 23, 26, 245, 239, 243, 244, 246, 712/215–219, 208, 212, 225, 240, 214; 711/200, 711/217, 203, 218, 204, 220, 219, 207, 208, 711/209, 210, 123, 211, 125, 212, 214, 215, 711/216, 221, 171, 172, 169
See application file for complete search history.

(56) References Cited

U.S. PATENT DOCUMENTS

| 5,095,424 | A | * | 3/1992 | Woffinden et al. ......... 711/123 |
| 5,475,823 | A | * | 12/1995 | Amerson et al. ......... 711/169 |
| 5,557,763 | A | * | 9/1996 | Senter et al. ............ 712/23 |
| 5,606,683 | A | * | 2/1997 | Riordan ................. 711/207 |
| 5,615,357 | A | * | 3/1997 | Ball ...................... 703/21 |
| 5,630,157 | A | * | 5/1997 | Dwyer, III ............... 712/23 |
| 5,659,782 | A | * | 8/1997 | Senter et al. ............ 712/23 |
| 5,666,506 | A | * | 9/1997 | Hesson et al. ........... 712/216 |
| 5,694,577 | A | * | 12/1997 | Kiyohara et al. ......... 711/167 |
| 5,706,224 | A | * | 1/1998 | Srinivasan et al. ........ 365/49 |
| 5,721,854 | A | * | 2/1998 | Ebcioglu et al. ......... 712/203 |
| 5,721,857 | A | * | 2/1998 | Glew et al. .............. 712/23 |
| 5,751,946 | A | * | 5/1998 | Afsar et al. .............. 714/50 |
| 5,761,740 | A | * | 6/1998 | Johnson et al. .......... 711/202 |
| 5,765,035 | A | * | 6/1998 | Tran ..................... 712/216 |
| 5,781,790 | A | * | 7/1998 | Abramson et al. ........ 712/23 |
| 5,802,575 | A | * | 9/1998 | Greenley et al. ......... 711/144 |
| 5,809,275 | A | * | 9/1998 | Lesartre ................. 712/216 |
| 5,822,559 | A | * | 10/1998 | Narayan et al. .......... 712/214 |
| 5,822,574 | A | * | 10/1998 | Tran ..................... 712/233 |
| 5,854,921 | A | * | 12/1998 | Pickett .................. 712/239 |
| 5,860,138 | A | * | 1/1999 | Engebretsen et al. ...... 711/202 |

(Continued)

OTHER PUBLICATIONS

Reinman et al, "Predictive Technique for Aggressive Load Speculation", Microarchitecture, 1998.*

*Primary Examiner*—Eddie P Chan
*Assistant Examiner*—Idriss N Alrobaye
(74) *Attorney, Agent, or Firm*—Lisa K. Jorgenson; William A. Munck

(57) ABSTRACT

The invention provides a method and system for operating a pipelined microprocessor more quickly, by detecting instructions that load from identical memory locations as were recently stored to, without having to actually compute the referenced external memory addresses. The microprocessor examines the symbolic structure of instructions as they are encountered, so as to be able to detect identical memory locations by examination of their symbolic structure. For example, in a preferred embodiment, instructions that store to and load from an identical offset from an identical register are determined to be referencing the identical memory location, without having to actually compute the complete physical target address.

16 Claims, 3 Drawing Sheets

U.S. PATENT DOCUMENTS

| | | | | |
|---|---|---|---|---|
| 5,872,987 A | * | 2/1999 | Wade et al. | 712/3 |
| 5,881,307 A | * | 3/1999 | Park et al. | 712/23 |
| 5,887,003 A | * | 3/1999 | Ranson et al. | 714/736 |
| 5,926,832 A | * | 7/1999 | Wing et al. | 711/141 |
| 5,987,593 A | * | 11/1999 | Senter et al. | 712/206 |
| 6,021,485 A | * | 2/2000 | Feiste et al. | 712/216 |
| 6,038,657 A | * | 3/2000 | Favor et al. | 712/216 |
| 6,070,238 A | * | 5/2000 | Feiste et al. | 712/217 |
| 6,141,747 A | * | 10/2000 | Witt | 712/225 |
| 6,216,200 B1 | * | 4/2001 | Yeager | 711/100 |
| 6,282,633 B1 | * | 8/2001 | Killian et al. | 712/208 |
| 6,360,314 B1 | * | 3/2002 | Webb, Jr. et al. | 712/219 |
| 6,463,523 B1 | * | 10/2002 | Kessler et al. | 712/216 |
| 7,447,876 B2 | * | 11/2008 | Senter et al. | 712/205 |
| 7,600,097 B1 | * | 10/2009 | Wright | 712/216 |

* cited by examiner

SYMBOLIC STORE-LOAD BYPASS

RELATED APPLICATIONS

This application claims priority to copending provisional application No. 60/114,295 entitled "Symbolic Store-Load Bypass", filed Dec. 31, 1998, by the same inventor.

The inventions described herein can be used in combination or conjunction with inventions described in the following patent applications (2):

- Application Ser. No. 60/114,296, Express Mail Mailing No. EE506030698US, filed Dec. 31, 1998, in the name of Anatoly Gelman, titled "Call Return Branch Production Buffer," assigned to the same assignee, and all pending cases claiming priority thereof; and
- Application Ser. No. 60/114,297, Express Mail Mailing No. EE506030684US, filed Dec. 31, 1998, in the name of Anatoly Gelman and Russell Schapp, titled "Block-Based Branch Table Buffer," assigned to the same assignee, and all pending cases claiming priority thereof.

These applications are hereby incorporated by reference as if fully set forth herein. These applications are collective referred to herein as "incorporated disclosures".

BACKGROUND OF THE INVENTION

1. Field of the Invention

This invention relates to microprocessor design.

2. Related Art

In microprocessors employing pipelined architecture, it is desirable to be in the process of executing as many instructions as possible, so that each element of the pipeline is maintained busy. However, some instructions, such as instructions that load data from external memory or store data into external memory, must generally be executed in their original sequence order, so as to avoid the external memory ever being in an incorrect state. Moreover, when such instructions refer to identical external memory locations, there is no particular need to wait for the actual external memory operations to complete, as the identical data is already available for the processor to operate with.

One problem in the known art is that determining whether two different instructions refer to the identical location in external memory generally requires computing the actual external memory address referenced by each of the two different instructions. This prolongs when the determination can be made, because it requires time (and typically, a pipeline stage) to actually compute the referenced external memory addresses.

Accordingly, it would be advantageous to provide a technique for operating a pipelined microprocessor more quickly, by detecting instructions that load from identical memory locations as were recently stored to, without having to actually compute the referenced external memory addresses. In a preferred embodiment, the microprocessor examines the symbolic structure of instructions as they are encountered, so as to be able to detect identical memory locations by examination of their symbolic structure. For example, instructions that store to and load from an identical offset from an identical register are determined to be referencing the identical memory location, without having to actually compute the complete physical target address.

SUMMARY OF THE INVENTION

The invention provides a method and system for operating a pipelined microprocessor more quickly, by detecting instructions that load from identical memory locations as were recently stored to, without having to actually compute the referenced external memory addresses. The microprocessor examines the symbolic structure of instructions as they are encountered, so as to be able to detect identical memory locations by examination of their symbolic structure. For example, in a preferred embodiment, instructions that store to and load from an identical offset from an identical register are determined to be referencing the identical memory location, without having to actually compute the complete physical target address.

DETAILED DESCRIPTION OF THE PREFERRED EMBODIMENT

In the following description, a preferred embodiment of the invention is described with regard to preferred process steps and data structures. Embodiments of the invention can be implemented using circuits in a microprocessor or other device, adapted to particular process steps and data structures described herein. Implementation of the process steps and data structures described herein would not require undue experimentation or further invention.

System Elements

Figure 1:
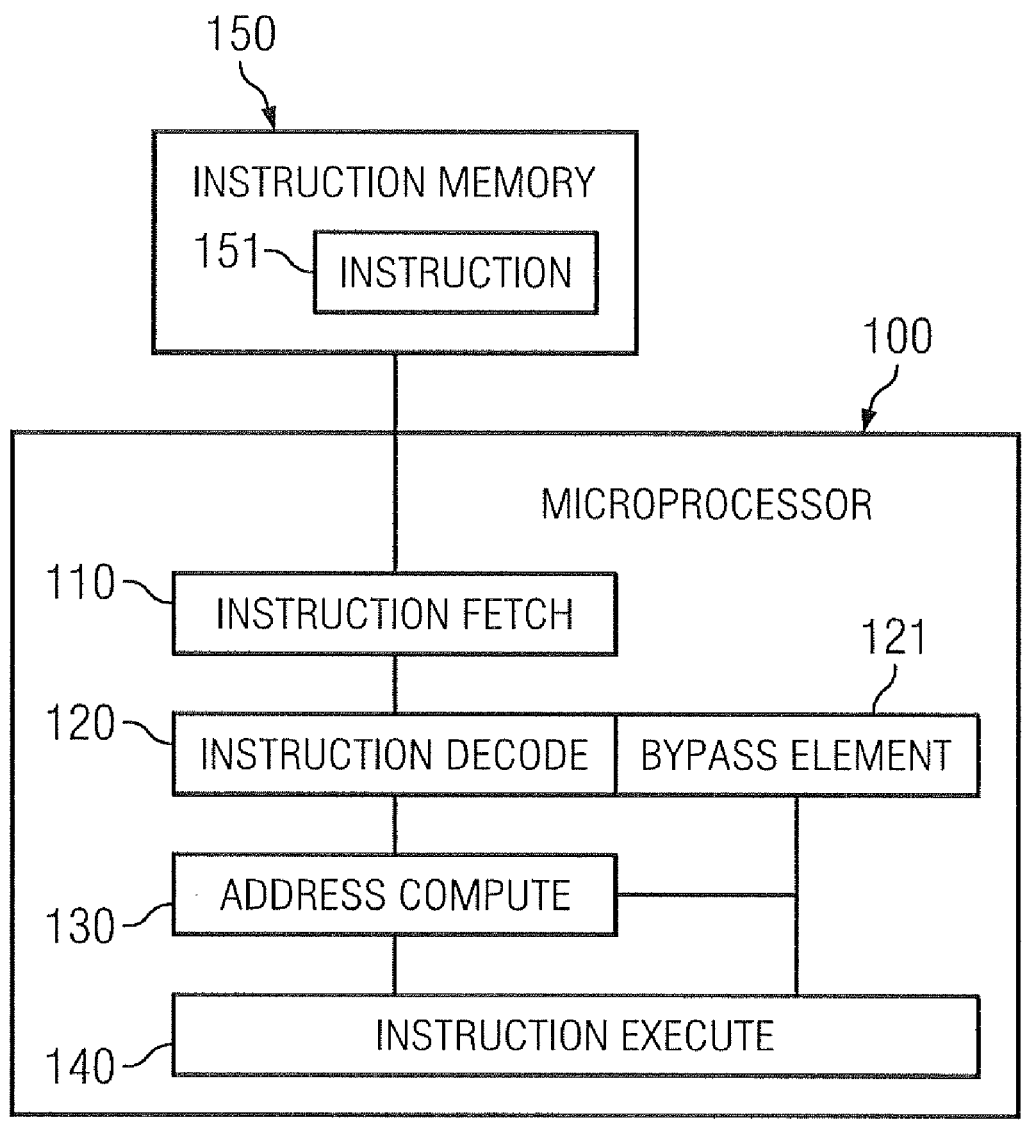
FIG. 1 shows a block diagram of a system in a pipelined microprocessor for detecting identical locations referenced by different load and store instructions.

FIG. 1 shows a block diagram in a pipelined microprocessor for detecting identical locations referenced by different load and store instructions.

A microprocessor 100 includes a sequence of pipeline stages, including an instruction fetch state 110, an instruction decode state 120, an address computation state 130 and an instruction execution state 140. In a preferred embodiment, the pipeline stages of the microprocessor 100 operate concurrently on sequences of instructions 151 in a pipelined manner. Pipeline operation is known in the art of microprocessor design.

In operation, the microprocessor 100 is coupled to an instruction memory 150 which includes a plurality of instructions 151, at least some of which are memory load or store instructions. In a preferred embodiment, the instruction memory 150 includes a random access memory. Memory caching operations can be performed either by the instruction memory 150, input and output elements of the microprocessor 100, or both. Memory caching operations, as well as other aspects of reading and writing memory locations, are known in the art of computer memories and so are not further described herein.

The microprocessor 100 reads a sequence of instructions 151 from the instruction memory 150 using the instruction fetch stage 110 (and including any associated memory read or write elements in the microprocessor 100). In a preferred embodiment, the input instruction buffer 110 includes a plurality of instructions 151 from the instruction memory 150, but there is no particular requirement therefor.

The instruction fetch stage 110 couples the instructions to the instruction decode state 120.

The instruction decode stage 120 parses the instructions 151 to determine what types of instructions 151 they are (such as instructions 151 that load data from external memory or store data to external memory). As part of the parsing instructions 151, and in addition to determine what operations the instructions 151 command the microprocessor 100 to perform, the instruction decode stage 120 determines the syntax of any addresses in the external memory that the instructions 151 refer to as operands.

For example, an instruction that loads data from external memory has a format that refers to the specific location in external memory from which to load the data. The format can include a base address value and an offset address value, which are to be added to compute the effective reference address of the instruction 151. The base address value can be a constant value or specify a value found in an internal register of the microprocessor 100. Similarly, the offset address value can be a constant value or specify a value found in an internal register of the microprocessor.

Similarly, an instruction that stores data to external memory has a format that refers to the specific location in external memory into which to store the data. The format can similarly include a base address value and an offset address value, which are used to compute the effective reference address of the instruction 151.

The instruction decode stage 120 couples the parts of the instruction 151, including information about the base address value and the offset address value, to the address computation stage 130.

The address computation stage 130 receives the base address value and the offset address value, and computes the effective reference address of the instruction 151.

The instruction decode stage 120 couples the parts of the instruction 151, including information about what operations the instructions 151 command the microprocessor 100 to perform, and what the syntax of any addresses the instructions 151 refer to as operands, to the instruction execution stage 140. The address computation stage 130 couples the effective reference address of the instruction 151, to the instruction execution stage 140.

The instruction decode stage 120 includes a symbolic load-store bypass element 121. The bypass element 121 examines the parts of the instruction 151, including information about what operations the instructions 151 command the microprocessor 100 to perform. If these operations are to load data from external memory, or to store data to external memory, the bypass element 121 further examines the syntax of any addresses 151 refer to as operands.

If the operand addresses the instructions 151 refer to include identical base address values and offset address values, the bypass element 121 generates a bypass signal indicating that the instructions 151 refer to the same location in external memory.

When the bypass signal is generating, the address computation stage 130, does not have to compute the actual effective address for the microprocessor 100 to act on the knowledge that the instructions 151 refer to identical locations in external memory.

For example, suppose that a first instruction 151 to store data refers to a location in external memory determined as (contents of register A)+(fixed offset value B), and a second instruction 151 to load data refers to the same location in external memory determined as (contents of register A)+ (fixed offset value B), where A and B are identical. In this case, the microprocessor 100 can proceed with the knowledge that the first (store) instruction 151 and the second (load instruction) 151 refer to the same location. Since the second (load) instruction 151 is going to read the same data from external memory that the first (store) instruction 151 put there, the microprocessor 100 can proceed by using that data from an internal register, rather than waiting for external memory to complete actual store and load operations.

Although the actual first (store) instruction 151 would be physically performed and completed by external memory, the microprocessor 100 can proceed without physically performing the second (load) instruction 151. Instead, the microprocessor 100 can use the identical data from its internal register, thus removing a relative delay in microprocessor 100 operation.

Method of Operation

Figure 2A:
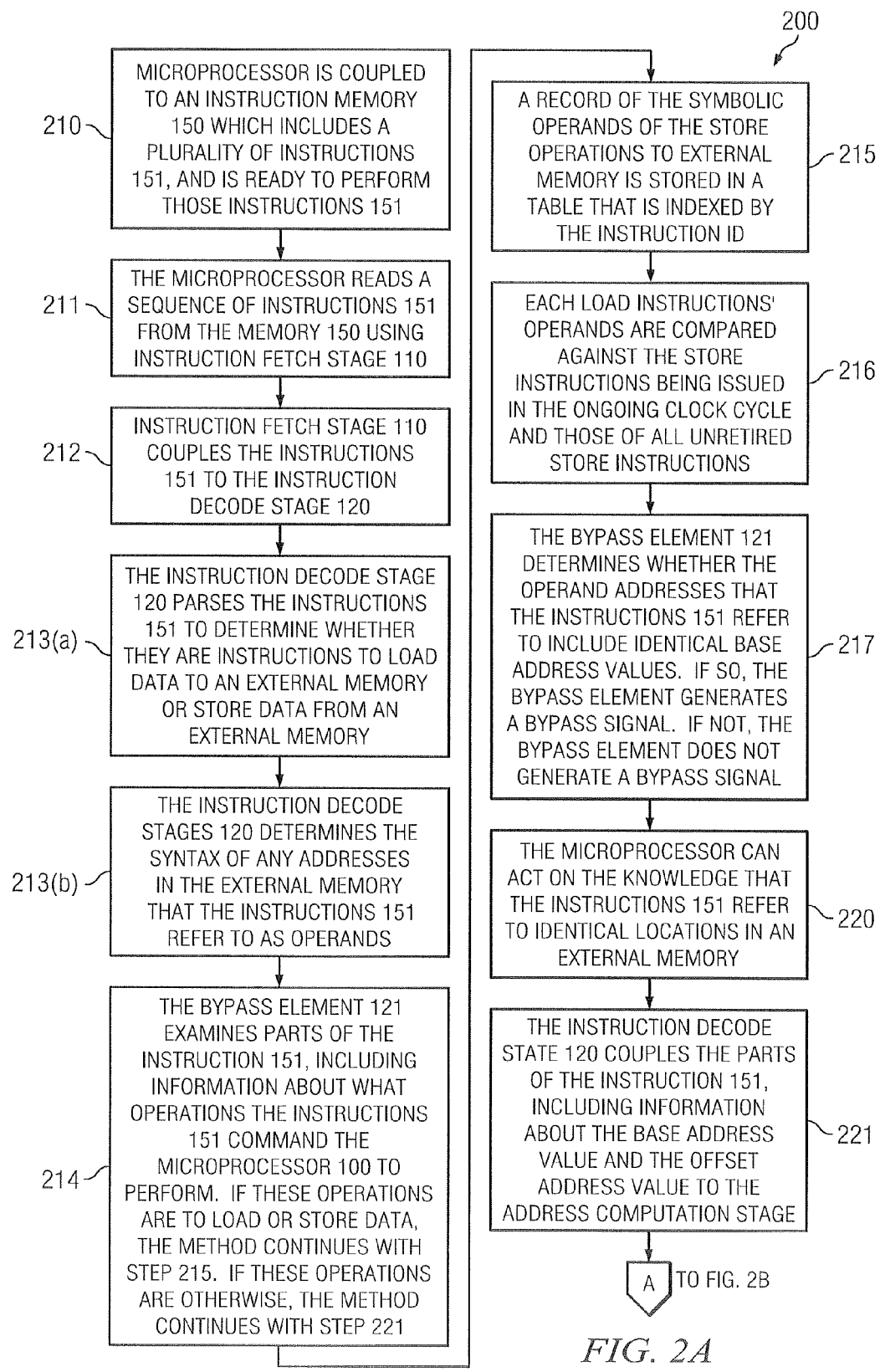
FIG. 2 shows a process flow diagram of a method for operating a system in a pipelined microprocessor for detecting identical locations referenced by different load and store instructions.
Figure 2B:
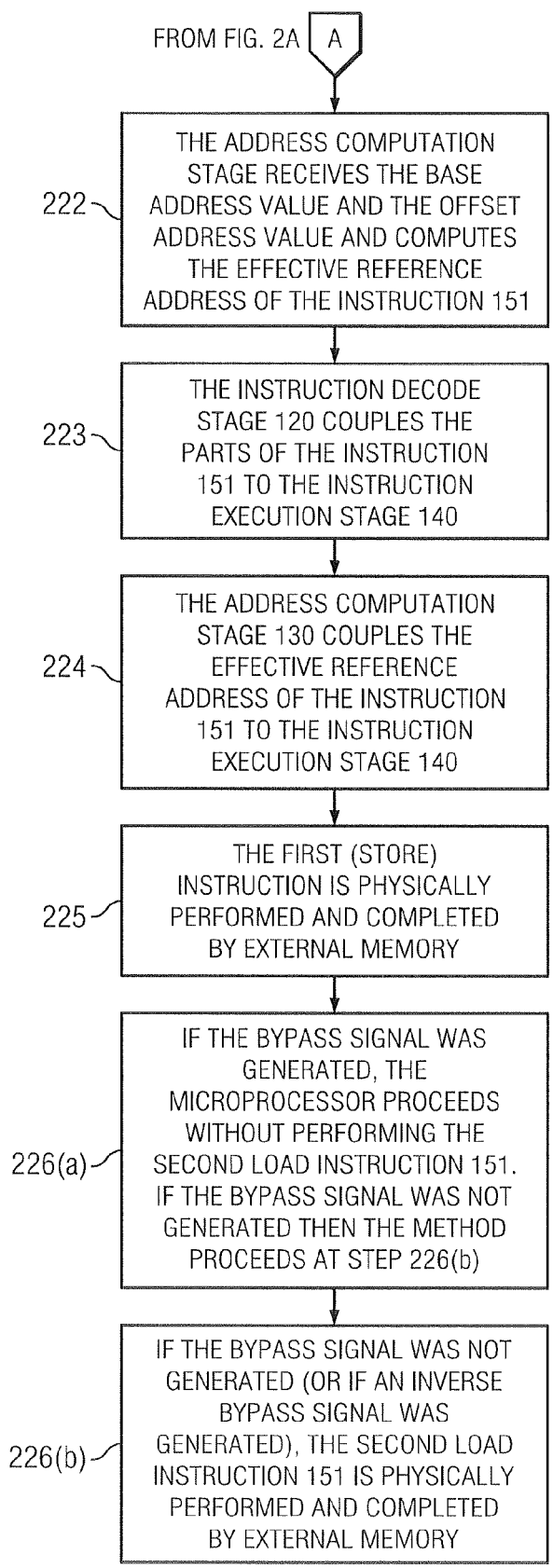

FIG. 2 shows a process flow diagram of a method for operating a system in a pipelined microprocessor for detecting identical locations referenced by different load and store instructions.

A method 200 is performed by the microprocessor 100, including its sequence of pipeline stages. In a preferred embodiment, as many steps of the method 200 are performed concurrently in a pipelined manner. Pipeline operation is known in the art of microprocessor design.

At a flow point 210, microprocessor 100 is coupled to an instruction memory 150, which includes a plurality of instructions 151, and is ready to perform those instructions 151. At least some of those instructions 151 are memory load or store instructions.

At a flow point 211, the microprocessor reads a sequence of instructions 151 from the memory 150 using the instruction fetch stage 110 (and including any associated memory read or write elements in the microprocessor 100).

At a step 212, the instruction fetch stage 110 couples the instructions 151 to the instruction decode stage 120.

At a step 213(a), the instruction decode stage 120 parses the instructions 151 to determine whether they are instructions 151 that load data from external memory or store data to external memory.

At a step 213(b), the instruction decode stage 120 determines the syntax of any addresses in the external memory that the instructions 151 refer to as operands.

At a step 214, the bypass element 121 examines the parts of the instruction 151, including information about what operations the instructions 151 command the microprocessor 100 to perform. If these operations are to load data from external memory, or to store data to external memory, the method continues with the step 215. If these operations are otherwise, the method continues with the step 221.

In a step 215, a record of the symbolic operands of the store operations to external memory is stored in a table that is indexed by the instruction ID.

In a step 216, each load instruction's operands are compared against both the store instructions being issued in the ongoing clock cycle and those of all unretired store instructions. By storing the record of these operations for comparison, there is a much higher probability of detecting a useful bypass in subsequent steps where the bypass element 121 further examines the syntax of any addresses the instructions 151 refer to as operands.

At a step 217, the bypass element 121 determines whether the operand addresses that the instructions 151 refer to include identical base address values and offset address values. If so, the bypass element 121 generates a bypass signal indicating that the instructions 151 refer to the same location in external memory. If not, the bypass element 121 does not generate a bypass signal. (In alternative embodiments, the bypass element 121 may generate an inverse bypass signal). If the bypass element 121 generates a bypass signal, the method 200 proceeds with the step 220. If not, the method 200 proceeds with the step 221.

At a flow point 220, the bypass signal having been generated, the microprocessor 100 can act on the knowledge that the instructions 151 refer to identical locations in external memory. For example, if a first (store) instruction 151 and a second (load) instruction 151 refer to identical locations in external memory, the microprocessor 100 can proceed by using data to be transferred by those instructions 151 from an internal register. The microprocessor 100 does not have to wait for external memory to complete actual store and load operations.

At a step 221, the instruction decode stage 120 couples the parts of the instruction 151, including information about the base address value and the offset address value to the address computation stage 130.

At a step 222, the address computation stage 130 receives the base address value and the offset address value, and computes the effective reference address of the instruction 151.

At a step 223, the instruction decode stage 120 couples the parts of the instruction 151, including information about what operations the instructions 151 command the microprocessor 100 to perform, and what the syntax of any address the instructions 151 refer to as operands, to the instruction execution stage 140.

At a step 224, the address computation stage 130 couples the effective reference address of the instruction 151, to the instruction execution stage 140.

At a step 225, the first (store) instruction 151 is physically performed and completed by external memory.

At a step 226(a), if the bypass signal was generated, the microprocessor 100 proceeds without physically performing the second (load) instruction 151. Instead, the microprocessor 100 can use the identical data from it's internal register, thus removing a relative delay in microprocessor 100 operation.

Alternatively, at a step 226(b), if the bypass signal was not generated, or in if an inverse bypass signal was generated, second (load) instruction 151 is physically performed and completed by external memory.

Alternative Embodiment

Although preferred embodiments are disclosed herein, many variations are possible which remain within the concept, scope and spirit of the invention, and these variations would become clear to those skilled in the art after perusal of this application.

The invention claimed is:

1. A pipelined microprocessor detecting a first instruction using first base and offset address values to load data from a first memory location that was previously stored to by an instruction using identical base and offset values, wherein the first instruction is detected based upon the first base and offset address values and without computing a memory address equaling the first base address value added to the offset address value in detecting the first instruction.

2. A pipelined microprocessor as claimed in claim 1 wherein the pipelined microprocessor detects a second instruction using second base and offset address values to store data into a second memory location that was previously read from, wherein the second instruction is detected based upon the second base and offset address values and without computing a memory address equaling the second base address value added to the offset address value in detecting the second instruction.

3. A pipelined microprocessor as claimed in claim 1 wherein the pipelined microprocessor examines base and offset address values used to access memory locations by store instructions that store data into the memory locations, and detects load instructions that load data from memory locations corresponding to base and offset address values identical to the base and offset address values used by the store instructions.

4. A pipelined microprocessor as claimed in claim 2 wherein the pipelined microprocessor examines base and offset address values used to access memory locations by load instructions that load data from the memory locations, and detects store instructions that store data into memory locations corresponding to base and offset address values identical to the base and offset address values used by the load instructions.

5. A pipelined microprocessor as claimed in claim 3 wherein the pipelined microprocessor detects identical offset address values and identical base address values in at least one register within the pipelined microprocessor.

6. A pipelined microprocessor as claimed in claim 4 wherein the pipelined microprocessor detects identical offset address values and identical base address values in at least one register within the pipelined microprocessor.

7. A pipelined microprocessor as claimed in claim 6 wherein the pipelined microprocessor comprises:
    an instruction decode stage detecting load instructions that load data from memory locations corresponding to offset address values from an identical and base address values identical to offset address values and base address values used by prior store instructions that store data into the memory locations; and
    a bypass element sending a bypass signal to an instruction execution stage of the pipelined microprocessor that indicates that a load instruction uses a base address value and an offset address value identical to a base address value and an offset address value used by a prior store instruction.

8. A pipelined microprocessor as claimed in claim 4 wherein the pipelined microprocessor comprises:
    an instruction decode stage detecting store instructions that store data into memory locations using offset address values and base address values identical to offset address values and base address values used by prior load instructions that load data from memory locations; and
    a bypass element sending a bypass signal to an instruction execution stage of the pipelined microprocessor that indicates that a store instruction uses a base address value and an offset address value identical to a base address value and an offset address value used by a prior load instruction.

9. A method for operating a pipelined microprocessor, comprising:
    detecting, in the pipelined microprocessor, a first instruction using first base and offset address values to load data from a first memory location that was previously stored to by an instruction using identical base and offset values, wherein the first instruction is detected based upon the first base and offset address values and without computing a memory address equaling the first base address value added to the offset address value in detecting the first instruction.

10. A method for operating a pipelined microprocessor as claimed in claim 9, further comprising:
    detecting, in the pipelined microprocessor, a second instruction using second base and offset address values to store data into a second memory location that was previously read from, wherein the second instruction is detected based upon the second base and offset address values and without computing a memory address equaling the second base address value added to the offset address value in detecting the second instruction.

11. A method for operating a pipelined microprocessor as claimed in claim 9, further comprising:
   examining, in the pipelined microprocessor, base and offset address values used to access memory locations by store instructions that store data into the memory locations; and
   detecting load instructions that load data from memory locations corresponding to base and offset address values identical to the base and offset address values used by the store instructions.

12. A method for operating a pipelined microprocessor as claimed in claim 10, further comprising:
   examining, in the pipelined microprocessor, base and offset address values used to access memory locations by load instructions that load data from memory locations; and
   detecting said instructions that store data into memory locations corresponding to base and offset address values identical to the base and offset address values used by the load instructions.

13. A method for operating a pipelined microprocessor as claimed in claim 11, further comprising:
   detecting, in an instruction decode stage of the pipelined microprocessor, load instructions that load data from memory locations corresponding to offset address values and base address values identical to offset address values and base address values used by prior store instructions that store data into the memory locations; and
   sending a bypass signal from a bypass element to an instruction execution stage of the pipelined microprocessor, wherein the bypass signal indicates that a load instruction uses a base address value and an offset address value identical to a base address value and an offset address value used by a prior store instruction.

14. A method for operating a pipelined microprocessor as claimed in claim 12, further comprising:
   detecting, in an instruction decode stage of the pipelined microprocessor, store instructions that store data into memory locations using offset address values and base address values identical to offset address values and base address values used by prior load instructions that load data from memory locations; and
   sending a bypass signal from a bypass element to an instruction execution stage of the pipelined microprocessor, wherein the bypass signal indicates that a load instruction uses a base address value and an offset address value identical to a base address value and an offset address value used by a prior store instruction.

15. A method for operating a pipelined microprocessor, comprising:
   detecting a first instruction that stores data to a first memory location, the first instruction comprising syntax for computing an effective address for the first memory location;
   detecting a second instruction that loads data from a second memory location, the second instruction comprising syntax for computing an effective address for said second memory location;
   determining the syntax for the first instruction and the syntax for the second instruction;
   using the syntax for the first instruction and the syntax for the second instruction to determine a relationship between the first memory location and the second memory location, without using the effective address of the first memory location or the effective address of the second memory location to determine the relationship between the first memory location and the second memory location; and
   using the relationship to determine whether to perform one of the first instruction and the second instruction.

16. A method for operating a pipelined microprocessor as claimed in claim 15, wherein the syntax for the first instruction and the syntax for the second instruction refer to an identical memory location.

* * * * *